A. ZINSSER.
Treating Shellac.

No. 108,550.

Patented Oct. 18, 1870.

WITNESSES:
C. Wahlers
E. F. Kastenhuber

INVENTOR:
August Zinsser
Von Saalwood & Hauff
Attys

United States Patent Office.

AUGUST ZINSSER, OF NEW YORK, N. Y.

Letters Patent No. 108,550, dated October 18, 1870.

IMPROVEMENT IN TREATING SHELLAC.

The Schedule referred to in these Letters Patent and making part of the same.

*To all whom it may concern:*

Be it known that I, AUGUST ZINSSER, of the city, county, and State of New York, have invented a new and useful Improvement in Treating Shellac; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
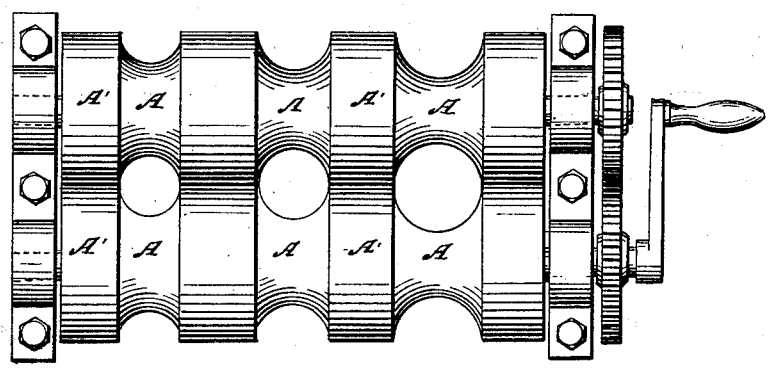
Figure 1 represents a plan or top view of the apparatus which I use in carrying out my invention.
Figure 2:
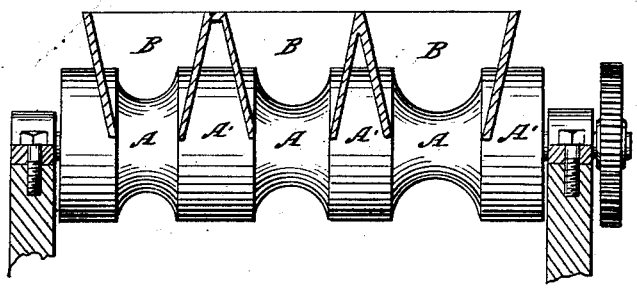
Figure 2 is a longitudinal vertical section thereof.

This invention consists in treating shellac, either bleached or unbleached, by first softening the same by hot water, steam, or other means, and then passing the same through between a succession of rollers of gradually decreasing size, in such a manner that the shellac is quickly and readily formed into bars of the required shape, and the laborious operation of malaxating shellac, which is usually carried on by hand, is materially simplified.

The ordinary operation of malaxating shellac, or the process of reducing shellac to the shape or form in which the same is sold in the market, is usually carried on as follows:

The shellac is softened in hot water, and then it is taken out and crutched or squeezed by hand, and finally drawn out to form thin long sticks, which are curled up into rolls or bundles, ready for the market.

Instead of crutching or squeezing the softened shellac by hand, I use a series of rollers, A, of gradually decreasing size, and as the shellac is successively passed through between said rollers, it is gradually squeezed and drawn out into sticks of the required size.

The rollers are geared together so that they revolve in opposite directions, and it is obvious that said rollers may be formed to produce round, polygonal, flat, or square sticks, or, in fact, sticks of any desired form or shape.

With the rollers A may be combined hoppers or funnels B, which serve to conduct the shellac in between the rollers, and prevent the same from getting in between the flat side flanges A' of the rollers, which would have a tendency to injure the mechanism or stop the motion of the apparatus.

What I claim as new, and desire to secure by Letters Patent, is—

The within-described process of treating or malaxating shellac, by first softening the same in hot water, or otherwise, and then passing it through between rollers, substantially as set forth.

This specification signed by me this 23d day of September, 1870.

AUGUST ZINSSER.

Witnesses:
W. HAUFF,
E. F. KASTENHUBER.